United States Patent Office 2,970,695
Patented Feb. 7, 1961

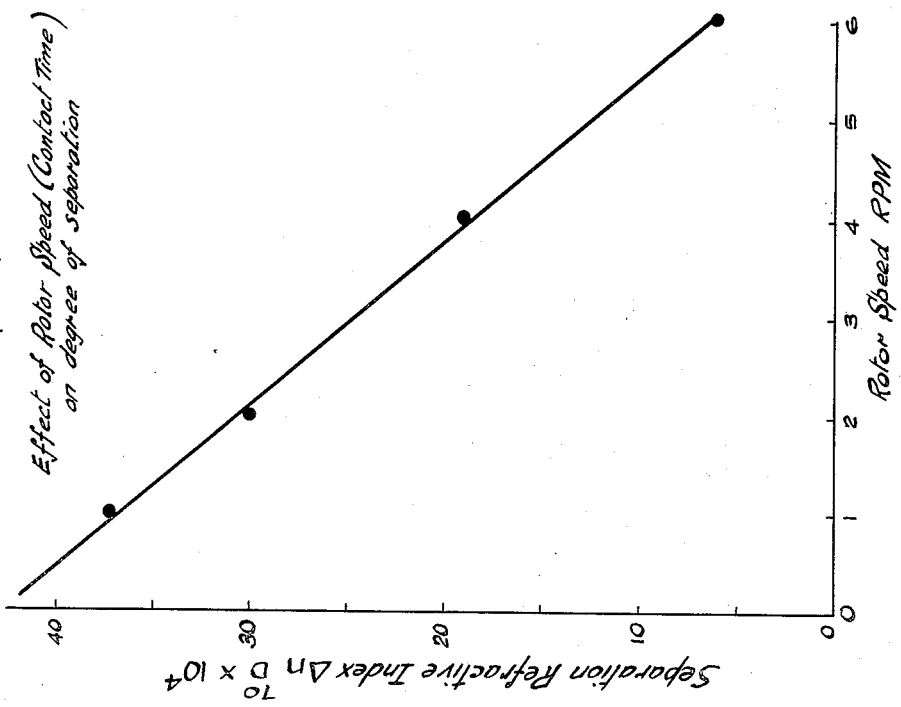
Fig. 4. — Effect of Rotor Speed (Contact Time) on degree of separation
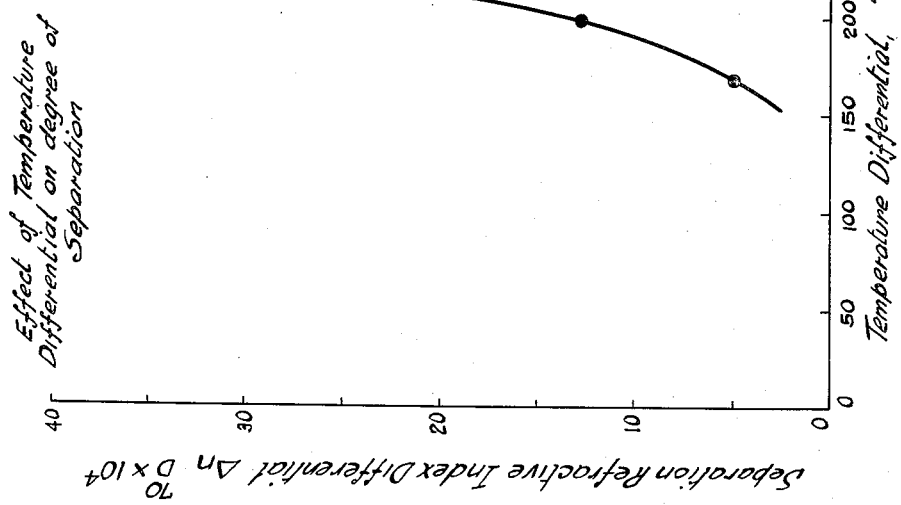
Fig. 5. — Effect of Temperature Differential on degree of Separation

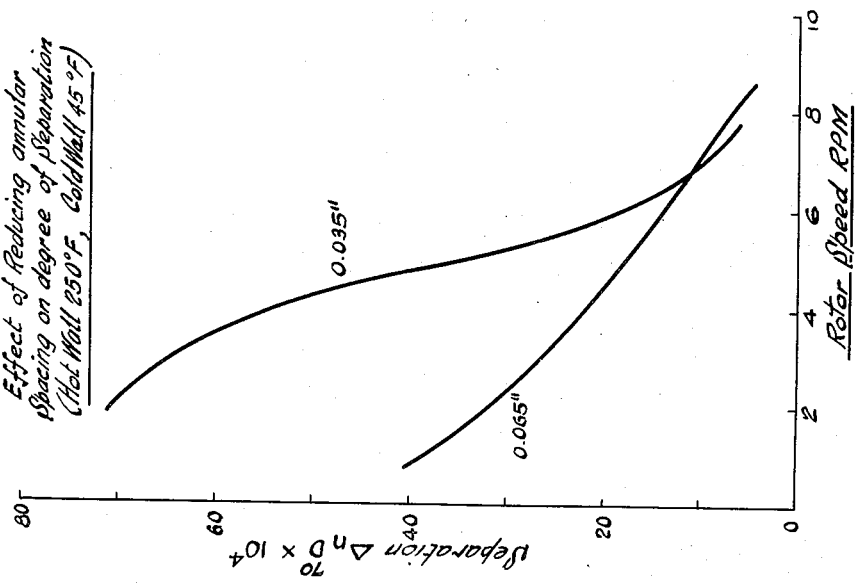
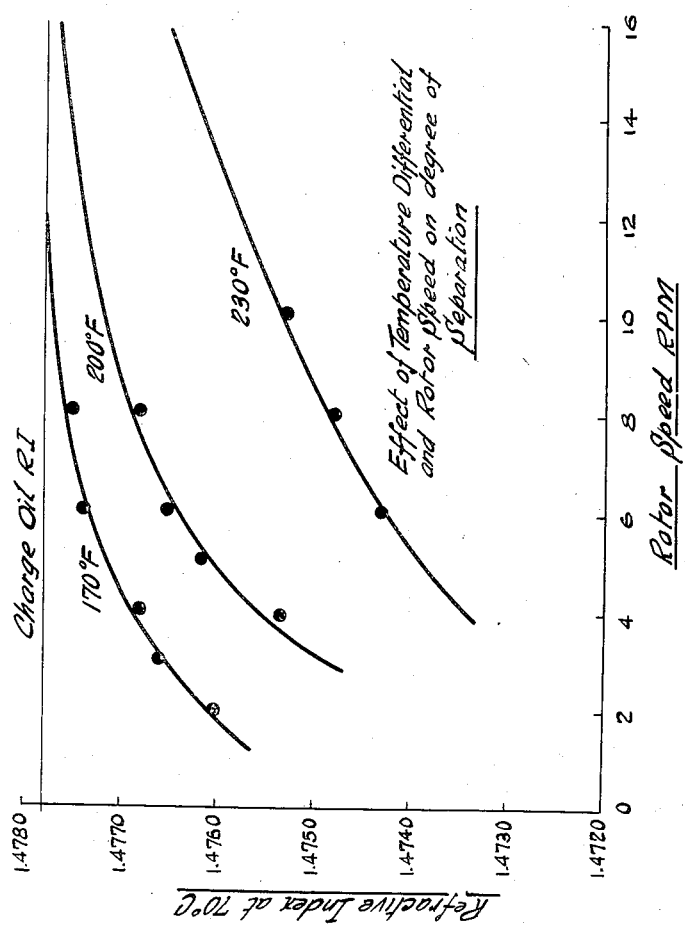

---

2,970,695

THERMAL DIFFUSION SEPARATION PROCESS AND APPARATUS THEREFOR

Robert L. Murphey, Groves, Marshall R. McClure, Jr., Port Arthur, and Calvin F. Rueping, Groves, Tex., assignors to Texaco Inc., a corporation of Delaware Filed May 7, 1958, Ser. No. 733,581

9 Claims. (Cl. 210—72)

This invention relates to the fractionation of liquid mixtures. More particularly, this invention relates to the fractionation of liquid mixtures, such as petroleum fractions or other liquid mixtures of organic materials, by thermal diffusion. In accordance with one embodiment the practice of this invention is directed to the fractionation of liquid mixtures in a continuous process employing thermal diffusion.

In the fractionation of liquid mixtures by thermal diffusion the liquid mixture to be fractionated is subjected to contact with a relatively cold surface and a relatively hot surface. During the thermal diffusion separation operation fractionation of the liquid mixture undergoing treatment takes place due to the migration of the various molecular constituents of the liquid mixture depending upon molecular weight and/or molecular configuration. After a sufficient period of time has elapsed various portions of the liquid mixture undergoing fractionation are separated therefrom, such as that portion which has migrated to and/or is adjacent to the relatively hot surface and that portion which has migrated to and/or is adjacent to the relatively cold surface. These separated portions will be found to possess a different composition and different characteristics compared to the liquid mixture originally subjected to thermal diffusion.

It is an object of this invention to provide an improved process for the fractionation of liquid mixtures, such as liquid petroleum fractions, liquid mixtures of organic compounds, heat-sensitive-molecular weight organic compounds and the like.

It is another object of this invention to provide an improved thermal diffusion process for the fractionation of liquid mixtures.

Another object of this invention is to provide an apparatus particularly useful for carrying out a thermal diffusion process.

Still another object of this invention is to provide a process and apparatus useful for carrying out a thermal diffusion fractionation process on a continuous basis.

Another object of the practice of this invention is to provide a flexible and versatile thermal diffusion process and apparatus suitable for use therein.

Figure 1:
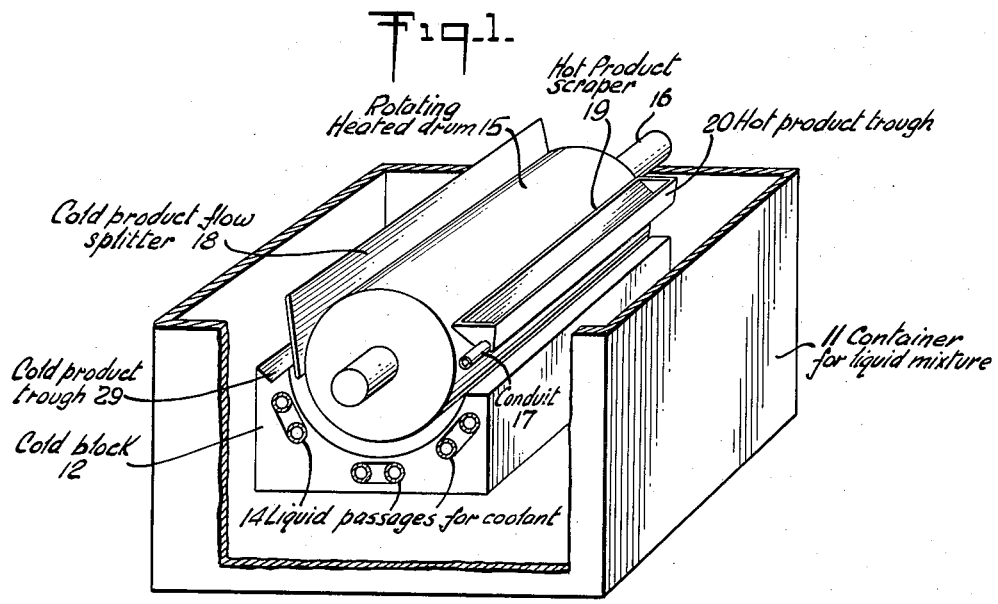
Figure 2:
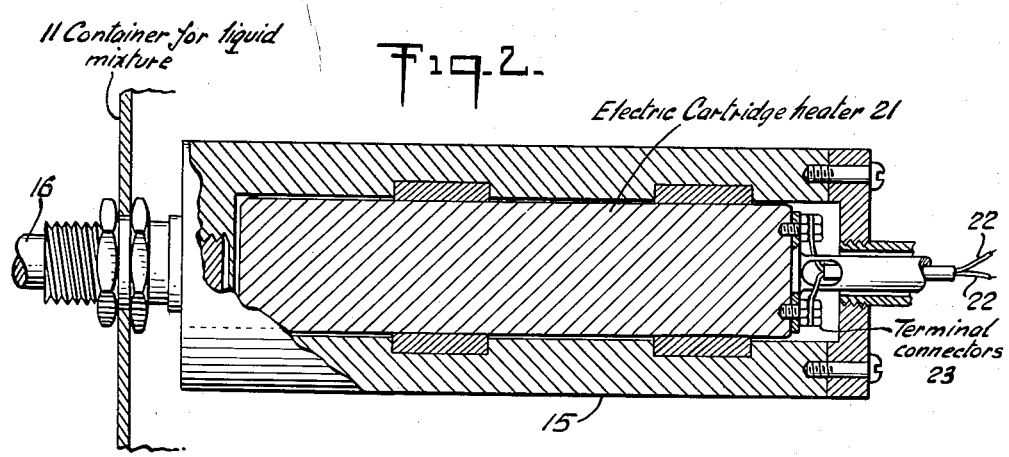

How these and other objects of this invention are accomplished will become apparent in the light of the accompanying disclosure and drawings wherein Fig. 1 is a cut-away, perspective view of an apparatus suitable for use in the practice of this invention, and wherein Fig. 2 is a longitudinal cross-sectional view of an element of the apparatus illustrated in Fig. 1, and wherein Figs. 3–6 graphically illustrate the advantages obtainable in accordance with the practice of this invention.

In accordance with the practice of this invention a liquid mixture separable by thermal diffusion is subjected to contact with a relatively hot element, the relatively hot surface of which is in contact with a relatively cool body of the liquid mixture to be fractionated. Following the aforesaid contacting operation the relatively hot element is removed from contact with the liquid mixture and a portion of the liquid mixture clinging to and/or wetting the surface thereof is recovered. The recovered portion of said liquid mixture has a composition different from that of the composition of the remaining liquid mixture.

In one practice of the process of this invention a relatively hot element is moved into and out of contact with the liquid mixture to be fractionated with the result that the relatively hot surface of said element becomes wetted with a portion of the liquid mixture undergoing fractionation. The wetted surface of the hot element remains in contact with the liquid mixture to be fractionated for a suitable time to effect a migration by thermal diffusion of certain of the molecular constituents of the liquid mixture toward the relatively hot surface immersed therein. After a sufficient time of contact, depending upon the composition of the liquid mixture undergoing fractionation and/or the temperature differential between the relatively hot surface in contact therewith and/or the temperature of said liquid mixture and/or other factors, such as the degree of fractionation desired and the relationship of the volume of liquid mixture with respect to the hot surface in effective contact therewith, the relatively hot surface together with a portion of the liquid mixture clinging thereto is withdrawn from contact with the liquid mixture undergoing separation, or the liquid mixture withdrawn from contact with the relatively hot surface and that portion of the liquid mixture wetting or clinging to the thus-removed hot surface recovered as product.

In the practice of this invention the temperature differential between the relatively hot surface and the body of the liquid mixture undergoing fractionation may be any suitable value effective to accomplish the desired fractionation. Generally a temperature differential in the range 50–400 degrees Fahrenheit, more or less, is sufficient, preferably a temperature differential in the range 100–250 degrees Fahrenheit. The temperature differential between the relatively hot surface and the body of liquid mixture undergoing fractionation directly affects the degree of separation and/or fractionation obtainable, particularly the rate of fractionation or separation of the molecular constituents thereof. More particularly, it has been observed that the higher the temperature differential the greater the degree of separation or fractionation achieved for a given contact time. Accordingly, by employing a relatively high temperature differential between the relatively hot surface and the liquid mixture undergoing fractionation the contact time necessary to effect a given degree of fractionation or separation of molecular constituents of the liquid mixture is reduced.

Similarly it has been observed that by increasing the contact time between the relatively hot surface and the relatively cool body of liquid mixture undergoing fractionation a given degree of separation or fractionation is obtainable at a lower temperature differential. Generally a contact time in excess of 1.5 seconds between the liquid mixture undergoing fractionation and that portion of the relatively hot surface in contact therewith is capable of yielding satisfactory results depending upon the degree of fractionation desired. Generally a contact time in the range 2 seconds through 2 minutes, more or less, is effective depending upon the degree of fractionation desired and the composition of the liquid mixture undergoing fractionation.

It has also been observed in the practice of this invention that the degree of fractionation obtainable is also influenced to some extent by the relative proximity and relative proportion of the liquid mixture undergoing fractionation to the relatively hot surface. More particularly, It has been observed that when a relatively cool element is immersed in a liquid mixture undergoing fractionation in close proximity to the surface of the relatively hot element, such that the space between the relatively hot surface and a relatively cool surface confining the liquid mixture undergoing fractionation is small, improved fractionation or separation is obtainable, the degree of fractionation, other conditions remaining the same, improving or increasing as the distance between the relatively hot surface and the relatively cool surface decreases. Generally in a thermal diffusion operation in accordance with the practice of this invention a spatial distance in the range 0.01–0.10 in. has been found to be effective although a distance as great as 0.5 in. separating the relatively hot surface and the surface of the relatively cool element or container might also be employed.

Referring now to Fig. 1 of the drawings which schematically illustrates an apparatus suitable for use in the practice of this invention there is illustrated therein a container 11 to hold the liquid mixture to be fractionated by thermal diffusion. Provided within container 11 is cold block 12 having passages 14 therethrough for the flow of liquid coolant in order to maintain cold block 12 relatively cool with respect to cylinder 15 which is mounted within container 11 in close proximity to cold block 12. Cylinder 15 is adapted to be rotated on shaft 16 by means not shown. A flow splitter 18 for relatively cold product is provided on one side of cylinder 15 to remove a portion of the oil clinging to cylinder 15 as it emerges from contact with the liquid mixture within container 11. That portion of the relatively cold product removed from cylinder 15 by means of flow splitter 18 is recovered via trough 29 which is desirably an integral part of cold block 12. On the other side of cylinder 15 in the direction of rotation thereof from flow splitter 18 there is provided a hot product scraper or knife edge 19 which is biased against the surface of cylinder 15 by suitable means such as a spring, not illustrated, to remove the remaining portion of the liquid clinging to the surface of cylinder 15 after having passed by flow splitter 18. The resulting recovered hot product is removed via trough 20 and conduit 17. As indicated in Fig. 1 knife edge 19 is the leading edge of and is substantially an integral part of hot product trough 20.

Referring now to Fig. 2 of the drawings which illustrates in longitudinal cross-section the fabrication of cylinder 15, as illustrated therein cylinder 15 is adapted to be rotated about a heater 21, such as a 600 watt Chromalox electric cartridge heater, provided within cylinder 15. Heater 21 is electrically heated by means of voltage and current supplied via wires 22 and terminal connectors 23.

In the operation of the apparatus illustrated in Figs. 1 and 2 of the drawings the cold block 12 is immersed in the liquid mixture to be fractionated save for the V-shaped trough on the side of cold block 12. Positioned adjacent and close to trough 29 is flow splitter 18 which is adjustable and positioned so that the knife edge thereof splits the annular space between the cold block 12 and the cylinder 15 as it emerges from contact with the liquid mixture in charge container 11. The cold wall product, that is, the outside portion of the liquid clinging to the surface of the cylinder 15 as it emerges from contact with the body of liquid mixture within container 11 and filling the annular space between cylinder 15 and cold block 12, is diverted by flow splitter 18 into trough 29 from which it is discharged and cooled as product.

The scraper blade 19 removes the hot oil product, i.e., that portion of the liquid clinging to the surface of cylinder 15 after the aforesaid cold product portion has been removed. Hot product scraper 19 is biased against the surface of cylinder 15 and, as indicated, forms the leading edge of the hot product trough 20. The resulting separated hot product is drawn off from scraper-trough 20 via conduit 17.

The surface temperature of the heated cylinder 15 is controlled by a 600 watt heater 21 as illustrated in Fig. 2. A surface temperature of about 350° F. and higher is readily obtainable on cylinder 15.

In carrying out the practice of this invention while employing the apparatus illustrated in Fig. 1 the container 11 was charged with oil to cover about one-half of cylinder 15. Additional oil was supplied as needed to maintain the level within container 11 substantially constant. Cold water was then circulated through cold block 12 via conduits 14 provided therein. The cylinder 15 was heated by means of heater 21 located therein and the cylinder rotated about heater 21 and within container 11 at a predetermined speed. When the desired predetermined cold and hot wall temperatures of the cold block 12 and cylinder 15, respectively, had been reached and the desired speed of rotation (r.p.m.) and oil level established, the cold wall product scraper or flow splitter 18 and the hot wall product scraper 19 were positioned and the respective products withdrawn. The degree of fractionation achieved was determined by refractive indices of the charge oil in the reservoir and the cold wall and hot wall products.

Tests demonstrated the effect of temperature differential between the hot and cold wall temperatures or between the hot wall (surface of cylinder) and body of liquid mixture to be fractionated on the degree of separation or fractionation obtainable. In these tests a liquid hydrocarbon mixture, viz. a dewaxed distillate petroleum fraction, having the properties set forth in accompanying Table I was employed.

TABLE I

*Properties of charge oil*

| | |
|---|---|
| Gravity, °API | 27.2 |
| Flash, °COC | 420 |
| Visc., SUS at 100° F. | 170.0 |
| Visc., SUS at 210° F. | 43.6 |
| VI | 80 |
| Color, Lovibond ½" | 80 |
| Pour, °F. | −5 |
| Carbon residue, percent | 0.03 |
| Neut. No. | 0.08 |
| Ash, percent | 0.01 |
| Sulfur, percent | 0.41 |
| Refractive index at 70° C. | 1.4778 |

The tests were made without cold block 12. Accordingly, the cold wall temperature corresponded to the temperature of the body of the charge oil within the container and into which the hot cylinder was immersed. The charge oil was circulated through a cooling coil placed in an outside ice water bath and entered the container at a temperature of approximately 75° F. Oil was withdrawn from the container and recirculated through the cooling coil. During these tests the temperature of the oil in the container, which temperature corresponded to cold wall temperature, varied from 80° F. to 130° F. The surface of the rotating cylinder during these tests was maintained at the temperatures of 250° F., 300° F. and 350° F. and temperature differentials of approximately 170, 200 and 230 degrees Fahrenheit were maintained during the three separate tests. At a constant low cylinder speed of 6 r.p.m. (cylinder diameter 2.25") the separation of the charge oil, as measured by refractive index difference between refractive indices of charge oil and hot wall product, varied from $4n\ D^{70} \times 10^4$ at a temperature differential of 170 degrees Fahrenheit to a separation of $35n\ D^{70} \times 10^4$ at a differential of 230 degrees Fahrenheit. The data obtained from these tests are set forth in accompanying Table II and the results obtained are graphically illustrated in accompanying Fig. 3. These tests demonstrated that the degree or amount of fractionation obtainable under given set of conditions varied directly or increased as the temperature differential between the hot wall and the cold wall or body of the liquid increased.

TABLE II

*Effect of temperature differential on separation*

| Run No. | 1 | | | | 2 | | | | 3 | | |
|---|---|---|---|---|---|---|---|---|---|---|---|
| Run Conditions: | | | | | | | | | | | |
| Charge Oil RI at 70° C. | 1.4778 | | | | 1.4778 | | | | 1.4778 | | |
| Hot Wall Temp., °F. | 250 | | | | 300 | | | | 350 | | |
| Cold Wall Temp., °F. | 80 | | | | 100 | | | | 120 | | |
| Temp. Differential, °F. | 170 | | | | 200 | | | | 230 | | |
| Cylinder Speed, r.p.m. | 2 | 3 | 4 | 6 | 8 | 4 | 5 | 6 | 8 | 6 | 8 | 10 |
| Hot Wall Product: Refractive Index at 70° F. | 1.4760 | 1.4766 | 1.4768 | 1.4774 | 1.4775 | 1.4753 | 1.4762 | 1.4765 | 1.4768 | 1.4743 | 1.4748 | 1.4753 |

Additional tests were carried out with various charge oils to demonstrate the effect of rotor speed or immersion or contact time upon fractionation of the liquid mixture undergoing separation by thermal diffusion in accordance with an operation carried out in the practice of this invention. In these tests a charge oil was subjected to fractionation by thermal diffusion while employing the apparatus illustrated in Fig. 1, including cold block 12. These tests indicated that the degree of fractionation obtainable varied inversely with increasing r.p.m. of the rotating hot cylinder, that is, the degree of fractionation decreased as the contact time of the liquid mixture with the hot wall decreased. The results of these tests employing a charge oil having the characteristics set forth in Table I and carried out at a hot wall-cold wall temperature differential of 140° F., and at varying temperature differentials, are graphically illustrated in accompanying Figs. 4 and 5, respectively. Table III sets forth the test data obtained during these tests.

TABLE III

*Effect of rotor speed on separation of various charge stocks (rotor diameter 2.25")*

| Run No. | 1 | | | | 2 | | | | 3 | | |
|---|---|---|---|---|---|---|---|---|---|---|---|
| Run Conditions: | | | | | | | | | | | |
| Charge Oil RI at 70° F. | 1.5274 | | | | 1.4921 | | | | 1.4928 | | |
| Hot Wall Temp., °F. | 250 | | | | 300 | | | | 350 | | |
| Cold Wall Temp., °F. | 110 | | | | 130 | | | | 130 | | |
| Temp. Differential, °F. | 140 | | | | 170 | | | | 220 | | |
| Mean Temp. Level, °F. | 180 | | | | 215 | | | | 240 | | |
| Rotor Speed, r.p.m. | 1 | 2 | 4 | 6 | 2 | 4 | 6 | 8 | 4 | 6 | 8 |
| Hot Wall Product: Refractive Index at 70° C. | 1.5237 | 1.5244 | 1.5255 | 1.5268 | 1.4908 | 1.4918 | 1.4921 | 1.4921 | 1.4908 | 1.4914 | 1.4914 |

Further tests were carried out to show the influence of the effect of increasing the annular distance between hot cylinder 15 and cold block 12 upon the degree of fractionation achieved. In these tests the clearance between the hot surface of cylinder 15 and the concentric cold surface of cold block 12 was varied. The results of these tests are graphically illustrated in accompanying Fig. 6. As accompanying Fig. 6 illustrates, decreasing the annular space separating the cylinder 15 and the cold block 12 tended to increase the separation efficiency. The increase in separation efficiency was more pronounced at slower cylinder speeds than at higher cylinder speeds.

Although Fig. 1 illustrates a thermal diffusion apparatus in accordance with this invention wherein a cold block is positioned in close proximity to the hot rotating cylinder, satisfactory results are obtainable when a relatively cold surface of any suitable form is immersed within the oil or liquid mixture undergoing fractionation to maintain the liquid mixture to be fractionated at a relatively low temperature with respect to the hot wall. Accordingly, a cold plate may be positioned in the bottom of container 11 with or without cold block 12. Further, various means other than scrapers or flow splitters separate or integral with respect to the collecting troughs, may be employed to effect removal of all or part of the liquid mixture clinging to the rotating hot surface. Suitable means which might be employed to remove the fractionated liquid mixture clinging to the hot surface include means for blowing a gas, such as air or a normally gaseous hydrocarbon or an inert gas such as nitrogen against the rotating hot surface to displace liquid therefrom. Other suitable means include displacing or washing the clinging liquid mixture from the hot rotating surface by means of a suitable liquid such as liquid propane or a liquid such as water or a selective solvent, e.g. an aromatic solvent such as furfural, or a dewaxing solvent, etc. immiscible with the liquid mixture undergoing fractionation, and which preferentially dissolves a portion of the liquid mixture.

One or more, such as a plurality, of the devices illustrated in Fig. 1 may be employed in series flow or in countercurrent flow arrangement to effect the fractionation of a liquid mixture to be separated.

Further, instead of a hot surface on a rotating cylinder various other hot surfaces may be employed such as the surface of a moving belt arranged to pass in and out of a body of liquid mixture to be separated. Also a disc may be arranged to pass in and out of a body of liquid mixture to be separated. If a disc is employed instead of scrapers positioned to remove clinging liquid therefrom the disc may be provided with suitable vents or ports or may be made of porous material and the clinging liquid mixture blown therefrom by passing a suitable gas from the inside of the porous disc to the outside thereof, or, if desired, the clinging liquid mixture may be withdrawn into the interior of the disc by applying a reduced pressure thereto relative to the disc ambient pressure.

Although considerable emphasis has been placed in this disclosure on the applicability of the practice of this invention to the fractionation of liquid hydrocarbon mixtures such as petroleum fractions, e.g., lubricating oil distillate fractions for the recovery of a relatively high VI fraction therefrom, it is mentioned that the apparatus and method disclosed herein are generally applicable to the separation of liquid mixtures. Other liquid mixtures which are suitably fractionated in accordance with the practice of this invention include heat sensitive vegetable and animal oils or fatty acid materials such as the drying oils, liquid admixtures of antibiotic materials of the penicillin type and other complex organic mixtures.

Various other embodiments and modifications in accordance with the practice of this invention will suggest themselves to those skilled in the art in the light of the accompanying disclosure.

We claim:

1. An apparatus suitable for the fractionation of liquid mixtures which comprises a container adapted to contain a body of a liquid mixture separable by thermal diffusion, a first element adapted to be moved within said container into and out of contact with said body of liquid mixture provided therein, a second element, relatively cool with respect to said first element positioned adjacent to and spaced from said first element within said container wherein said first element moves into and out of contact with said body of liquid mixture, first means adapted to remove a portion of said liquid mixture retained on said first element as it moves out of contact with said body of liquid mixture within said container and a second means adapted to contact the surface of said first element after it has moved out of contact with said body of liquid mixture provided within said container and after a portion of the retained liquid mixture has been removed therefrom by said first means to remove the remaining portion of said liquid mixture retained on the surface of said first element, said first element being provided with heating means adapted to maintain the surface of said first element in contact with said body of liquid mixture relatively hot with respect to the body of said liquid mixture provided within said container.

2. An apparatus in accordance with claim 1 wherein said first element is a cylinder adapted to be rotated within said container.

3. An apparatus in accordance with claim 1 wherein said first element is a cylinder adapted to be rotated within said container and wherein said second element is a cooled surface concentric with respect to said cylinder and partially encircling said cylinder and defining an annular space therebetween.

4. A method of fractionating a liquid mixture by thermal diffusion which comprises contacting said liquid mixture with a relatively hot surface while maintaining part of said liquid mixture relatively cool with respect to said relatively hot surface, moving said relatively hot surface out of contact with said liquid mixture with a portion of liquid from said mixture immediately adjacent said hot surface retained thereon, mechanically splitting away from said portion retained on said hot surface another more remote portion of liquid from said liquid mixture, recovering said liquid remaining on said hot surface following said mechanical splitting step, and separately withdrawing from said liquid mixture at substantially the point of withdrawal of said relatively hot surface from said liquid that portion of said liquid mixture mechanically separated from said hot surface.

5. A method in accordance with claim 4 wherein the temperature differential existing between said relatively hot surface and said relatively cool liquid mixture is in the range 50–400 degrees Fahrenheit.

6. A method in accordance with claim 4 wherein the relative motion between said hot surface and said relatively cool liquid mixture when said relatively hot surface is withdrawn from contact with said liquid mixture is at a relative speed in excess of 7 inches per minute.

7. A method in accordance with claim 4 wherein said relatively hot surface is in contact with said relatively cool mixture for a period of time in excess of 1.5 seconds.

8. In a process for effecting fractionation of a liquid mixture by thermal diffusion wherein a heated cylindrical surface is rotated about a substantially horizontal axis so that said heated surface moves into and out of contact with said liquid mixture during rotation, said surface when leaving said liquid mixture retaining a layer of liquid from said mixture thereon, the method which comprises mechanically splitting said layer of liquid retained on said removed surface, effecting mechanical removal of a portion of said retained more remote from said surface while permitting a portion immediately adjacent said surface to remain thereon, subsequently removing the remaining portion of said retained liquid from said surface, recovering said subsequently removed portion, and separately recovering said more remote portion mechanically split therefrom.

9. In a method of fractionating a liquid mixture of hydrocarbons wherein said liquid mixture is contacted with a relatively hot surface along a path adjacent to but spaced from a relatively cool surface whereby movement of said hot surface induces movement of liquid adjacent thereto in the direction of movement of said hot surface, withdrawing said hot surface from said liquid, mechanically splitting said induced stream of liquid along said hot surface into a portion immediately adjacent said hot surface and a portion more remote therefrom, and separately recovering said portion of said induced stream immediately adjacent said hot surface and the portion of said induced stream mechanically split therefrom as products of the process.

References Cited in the file of this patent

UNITED STATES PATENTS

| | | |
|---|---|---|
| 2,720,976 | Jones | Oct. 18, 1955 |
| 2,743,014 | Frazier | Apr. 24, 1956 |
| 2,743,015 | Jansma | Apr. 24, 1956 |

UNITED STATES PATENT OFFICE
CERTIFICATION OF CORRECTION

Patent No. 2,970,695                        February 7, 1961

Robert L. Murphey et al.

It is hereby certified that error appears in the above numbered patent requiring correction and that the said Letters Patent should read as corrected below.

In the grant, lines 1, 2, and 3, for "Robert L. Murphey, of Groves, Marshall R. McClure, Jr., of Port Arthur, and Calvin F. Rueping, of Groves, Texas," read -- Robert L. Murphey, of Groves, Marshall R. McClure, Jr., of Port Arthur, Calvin F. Rueping, of Groves, and Richard L. Winstead, of Port Arthur, Texas, --; in the heading to the printed specification, lines 4 and 5, for "Robert L. Murphey, Groves, Marshall R. McClure, Jr., Port Arthur, and Calvin F. Rueping, Groves, Tex.," read -- Robert L. Murphey, Groves, Marshall R. McClure, Jr., Port Arthur, Calvin F. Rueping, Groves, and Richard L. Winstead, Port Arthur, Tex., --; column 1, line 43, for "heat-sensitive-molecular" read -- heat-sensitive high molecular --.

Signed and sealed this 20th day of June 1961.

(SEAL)
Attest:

ERNEST W. SWIDER
Attesting Officer

DAVID L. LADD
Commissioner of Patents